United States Patent [19]

Reinert, Sr.

[11] Patent Number: 5,431,510
[45] Date of Patent: Jul. 11, 1995

[54] OVERLAY PROTECTION PLATE APPARATUS AND METHOD

[76] Inventor: Gary L. Reinert, Sr., 4319 Middle Rd., Allison Park, Pa. 15101

[21] Appl. No.: 171,094

[22] Filed: Dec. 21, 1993

[51] Int. Cl.$^6$ ............................................. E01L 17/00
[52] U.S. Cl. ........................................ 404/72; 404/26
[58] Field of Search ...................... 404/72, 26; 174/57; 362/332, 334

[56] References Cited

U.S. PATENT DOCUMENTS

| 4,145,153 | 3/1979 | Fasullo et al. | 404/34 X |
|---|---|---|---|
| 4,622,435 | 1/1986 | Trainor et al. | 174/57 |
| 5,195,841 | 3/1993 | Mullins | 404/26 X |
| 5,205,668 | 4/1993 | Adams | 404/26 |

FOREIGN PATENT DOCUMENTS

1021451 12/1957 Germany .
WO8802852 4/1988 WIPO .

OTHER PUBLICATIONS

U.S. Department of Transportation, Federal Aviation Administration, Advisory Circular AC No. 150/5345-42C "Specification for Airport Light Bases, Transformer Housings, Junction Boxes, and Accessories," dated Jun. 8, 1989, pp. i–iv, 1–34.
Olson Industries, Drawing "L-868 Mud Plate".
Olson Industries, Drawing "L-868 Plywood Cover".
ADB-ALNACO, Inc. Cat. Sht. 1010B "L-850D Bidirectional & Unidirectional Threshold/End Light".
ADB-ALNACO, Inc. Cat. Sht. 1028B "L-850E Approach Threshold Light".
ADB-ALNACO, Inc. Cat. Sht. 1034B "L-850A Low-Energy Runway Centerline Inset Light".
Olson Industries, Drawing "L-868 Bottom Section".
Olson Industries, Drawing "L-868 Middle Section".
Olson Indsutries, Drawing "L-868 Top Section".
Olson Industries, Drawing "L-868 Spacer Ring".
Olson Industries, Drawing "L-867 Extension", 2 pp.

*Primary Examiner*—William P. Neuder
*Attorney, Agent, or Firm*—Douglas G. Glantz

[57] ABSTRACT

Overlay protection plate apparatus and method are provided to protect partially embedded light fixture supports for airport inset lights for runways, taxiways, or other aircraft ground traffic areas. The overlay protection plate apparatus and method provide protection against paving material entering the light fixture support during airport paving operations. Novel plate locating means and method locate the position of the overlay protection plate after the airport paving operations have covered over the overlay protection plate. Novel plate withdrawal means remove the covered overlay protection plate together with the pavement cover in substantially one piece over the overlay protection plate.

20 Claims, 5 Drawing Sheets

OVERLAY PROTECTION PLATE APPARATUS AND METHOD

BACKGROUND OF THE INVENTION

1. Technical Field

This invention relates to overlay protection plate apparatus and method. In one aspect, the invention relates to overlay protection plate apparatus and method for specialized, set-in-the-ground lighting systems utilized for the purpose of guiding pilots during their approach to an airport runway and during the landing and taxi of aircraft.

2. Background

Conventional lighting fixtures forming part of specialized, set-in-the-ground airport lighting systems are mounted on certain steel containers. The steel containers for these airport inset lights can be one-part or two-part and, sometimes, three-part containers and are set below the surface of runways, taxiways, and other aircraft ground traffic areas. The bottom sections of the containers are sometimes called shallow light bases. The top sections are called fixed-length extensions and are manufactured in different fixed lengths and diameters. Flat spacer rings are installed between the extensions and the lighting fixtures for providing height and azimuth adjustments. These conventional steel containers, in addition to serving as bases for mounting the lighting fixtures, also serve as transformer housings and junction boxes to bring electrical power to the lighting fixtures.

The top portion of the lighting fixtures are installed at a close tolerance, slightly above the pavement surface. Installations of the containers and their lighting fixtures are required on two different occasions. The first is when the runways, taxiways, and other aircraft ground traffic areas are built for the first time. The second is for re-surfacing or re-paving of the runways, taxiways, and other aircraft ground traffic areas. The latter is the most common, i.e., most frequent.

When the airport set-in-the-ground lighting system is installed for the first time, the bottom sections of the containers are generally set in a granular sub-base fill, in holes larger than the container's bottom sections. The granular sub-base fill, which can be one to two feet in height, typically constitutes the entire sub-base of the runway, taxiway, or other aircraft ground traffic area.

Electrical conduit is installed in trenches in the sub-base material and fastened to the containers. Electrical wires are pulled through and into each container, which is set precisely aligned in azimuth and height. The trenches then are filled with concrete, and concrete then is poured under and around the containers to encase and anchor them to the sub-base.

At this point, the top flange (inverted flange) of the bottom section of each container is positioned flush with the surface of the granular sub-base in which the concrete-encased container is set.

A ¾ inch thick plywood cover and a metal plate on top of it are bolted, with six bolts, to the top flange of each container bottom section. The container top flange has holes drilled and tapped with the same bolt circle as the plywood covers and metal plates. The top flange of the bottom section of each container, with its plywood cover and metal plate bolted on it, is set to the height of the surface of the granular sub-base. The purpose of the plywood cover and metal plate is to prevent debris from falling into the bottom section container and to prevent the container flange from being damaged during runway construction. The FAA (Federal Aviation Administration) designation for the metal plate is "mud plate."

If the runway, taxiway, and other aircraft ground traffic area being built are to be constructed with bituminous material, e.g., such as asphalt, instead of concrete, a shingle or other thin material will be placed on top of the mud plates before the tack coat is applied. Prior to paving, the thin material is removed, and the mud plates are lightly wiped with rags soaked in vegetable oil to facilitate the subsequent removal of the asphalt from its surface.

A first course of asphalt, e.g., such as at a depth of four inches or more, is laid down, burying the mud plates under it. The asphalt then is compacted by heavy rolling machines.

For core drilling to begin, the location of each container center point then must be found. Surveyors find the approximate location of each buried container using transits and previously established reference points. The surveyor makes reference markings on the pavement to indicate approximately where the center point of each container should be found or located. The surveyed center point is required for the precise setting of a core drilling bit.

The electrical contractor then drills one or more two-inch pilot holes to the depth of the top of the mud plate. Through these pilot holes, the contractor can determine how close the surveyed center point is to the container center point, by observing the position of raised concentric circles or raised radial markings on the top of the mud plate.

When the precise container center point is determined, a core drilling is made with a drilling bit one inch larger in diameter than the diameter of the buried container. For example, Type L-868 Class I containers are manufactured, per FAA (Federal Aviation Administration) specification, in three sizes: A, B, and C, with nominal outside diameters of 10, 12, and 15 inches, respectively. The core drilling would be 11, 13, or 16 inches, respectively.

When the core drilling is completed, jack hammers are used to break the core-drilled, compacted asphalt cylinder into smaller pieces. The jack hammer technique makes for hard work, a highly labor intensive consuming chore. As a further drawback, the jack hammering on many occasions damages the mud plate by breaking or bending one or more of its bolts.

After jack hammering, the asphalt around the six bolts of the top flange must be cleaned out by hammer and chisel to permit removal of the bolts. The debris then must be removed to prevent the debris from falling into the container below.

After the bolts are removed, it is still difficult to pry away the plywood cover and mud plate, since the work is done kneeling down, working inside a hole with very little room between the wall of the hole and the items to be removed.

After the plywood covers and mud plates are removed, an extension is bolted onto the bottom container's top flange.

The plywood covers and mud plates are bolted down again, this time onto the fixed-length extensions, thereby bringing the surface of the mud plates flush with the newly laid asphalt surface. The surface is then ready for the second course, e.g., four to six inches thicknesses of new asphalt. Again, as with the previous course of asphalt, a shingle or other thin material will be placed on top of each mud plate before the tack coat is applied. Prior to paving, the shingle or other thin material is removed, and the tops of the mud plates are wiped with a rag soaked in vegetable oil. Altogether, two or three courses of asphalt are laid down and compacted by rolling machines, with each course compacted individually.

Because the core drilling diameter is larger than the diameter of the containers, after the extensions and the lighting fixtures are finally installed, an empty space remains between the extensions to which the lighting fixtures are bolted and the wall of the bore hole.

Each airport paving project may consist of installing hundreds of lighting fixtures and their inset containers.

Runways, taxiways, and other aircraft ground traffic areas deteriorate with years of usage. This creates the need for resurfacing or repaving, i.e., replacing the asphalt of these ground surfaces. Repavement is a much more common, i.e., frequent, occurrence than the construction of new pavements.

If the runway, taxiway, apron, or the like is being repaved instead of being newly built, the process starts by removing the lighting fixtures, any spacer rings, and the extensions from the bottom sections of the containers. Removal is required because several inches of the existing, deteriorated pavement must be removed and milled by high speed roto-milling machines.

Before milling, a plywood cover and mud plate are bolted, by means of six bolts, onto the top flange of the bottom section of the containers to prevent debris falling into the containers and to prevent damage by the milling machines to the top flange of the bottom sections.

Then the pavement surface is milled down to the same elevation as the top of the mud plates. After the roto-milling is complete, the entire area is broom cleaned by brooming machines.

After the roto-milling and broom cleaning of the area, the tack coat is applied. Every mud plate is covered as previously described, with a shingle or other thin material, which is removed prior to laying down the asphalt pavement. Approximately four to six inches thicknesses of asphalt pavement are laid over the mud plates and the plywood covers.

Then the process as previously described (for new construction) is carried out in the same manner for repaving. Surveyors locate each container center point and mark approximate locations on the new pavement. Two-inch pilot holes are drilled to determine more precisely the location of the center points. Core drillings are made, and each core-drilled, compacted asphalt cylinder is removed from the core-drilling by jack hammering. The remaining smaller pieces of asphalt are removed from around the six bolts by hammer and chisel. The generated debris is cleaned out. The six bolts are removed. The mud plate and plywood cover are pried out of the bore hole. Any sheared bolt is drilled out, and the container flange retapped, making it ready to receive the new fixed-length extension and lighting fixture. The core drilling diameter is larger than the diameter of the container after the extension and the lighting fixture are finally installed, and an empty space remains between the extension to which the lighting fixture is bolted and the wall of the bore hole.

Since pavement milling contracts stipulate penalties to contractors for undermilling, i.e., taking off less pavement thickness than specified, contractors protect themselves by setting the roto-milling level as low as can be done safely. In doing so, the bolt heads often are damaged either by rounding them out of shape or by shearing them off or bending them. This situation seriously increases the labor costs an electrical contractor must build into the bid, because of the difficulty of removing bolts with rounded-off heads (a socket set will not work, forcing the use of vise grips or channel locks) or drilling out the studs of bolts that have been sheared off and then having to retap the hole or holes. Removing bent bolts is also a difficult task.

If a runway, taxiway, or other aircraft ground traffic area being built is to be constructed with concrete instead of asphalt overlaid on top of the granular sub-base, the containers (whether of a one section or multiple section type) would be set to their final height from the beginning, rather than setting them to the elevation of the surface of the granular sub-base.

This is because the concrete, whether poured in one layer or in several layers, does not require compaction by rolling machines as does asphalt.

The plywood covers and mud plates are installed to prevent having concrete enter into the container itself or into the drilled and tapped bolt holes. The concrete is poured over the height of the mud plate because, as previously described, when the lighting fixtures are installed, a portion of each fixture will be inset to keep its top side slightly above the final surface. Therefore, a portion of each lighting fixture will be under the final surface, but its top will be slightly above it.

Each mud plate thus is covered with concrete and has to be found. Location of the mud plate is simple in this case compared to asphalt because the concrete on top of the mud plate is much thinner than the concrete surrounding the rest of the container. As a result, the thinner concrete cures faster, showing a round spot of a different shade or color than the rest of the surrounding surface. All such containers are in a straight line and are readily locatable, as are their center points.

For the concrete installations, since the concrete above the mud plate is very thin, a cookie cutter is placed in the concrete, from a bridge, while the concrete is still soft. The diameter of the cookie cutter is larger than the diameter of the container below. By doing this, in concrete installations, there is no need for core drilling.

The hardened concrete is chiseled out, e.g., by hammer and chisel and breaks up easily. This chiselling is done to provide access to the six bolts on the mud plates to unbolt and remove the mud plates and plywood covers for installing the lighting fixtures and for the adjustment of their height and azimuth.

The main function of the ¾ inch thickness plywood covers in this application is to cushion the impacts of the hammer-chiseling from acting directly against the top flange of the container extension and damaging it.

The mud plate and plywood cover constitute the existing art. There are many costly problems and drawbacks associated with the utilization of conventional mud plates and plywood covers in conventional or prior art methods. One problem is the expense involved in using surveyors and transits to find the center point of the mud plates and mark them on the newly laid pavement.

Another drawback is the requirement for drilling one or more two-inch pilot holes to verify that the center point, as marked by the surveyor, is the exact center point of the mud plate, and to provide the necessary precision for centering the core drilling machine.

A further drawback is the requirement for jack hammering out the core-drilled, compacted asphalt cylinder, after the core drilling is done to remove the core-drilled asphalt cylinder from the top of the mud plate. The many pieces of asphalt pavement created by the jack hammering must be removed and the debris loaded up on a truck, container site by container site. Hammering and chiseling out of smaller pieces of asphalt stuck to the six bolts are difficult tasks, including but not limited to doing it while kneeling down over the bore hole.

Another drawback is cleaning up all the small pieces chiseled out and removing them from the bore hole and from the aircraft traffic area.

The conventional methods result in bolts with rounded-off heads, sheared-off heads, or bent bolts, resulting from roto-milling or jack hammering. Therefore, another drawback is dealing with such bolts while kneeling down over the bore hole, by drilling studs and retapping bolt holes, or by removing the six bolts even when none are damaged.

It is also a drawback of conventional methods in the requirement for prying-out both the mud plate and the plywood cover, while kneeling down and with very little space between the edge of the mud plate and plywood cover and the wall of the bore hole.

Therefore, it is an object of the present invention to provide an overlay protection plate apparatus and method which eliminate the need to utilize surveyors for finding the center points.

A further object of the present invention is to provide an overlay protection plate apparatus and method which eliminate the need for drilling two-inch pilot holes.

It is yet another object of the present invention to provide an overlay protection plate apparatus and method which eliminate the need for jack hammering to remove the core-drilled asphalt cylinder.

Another further object of the present invention is to provide an overlay protection plate apparatus and method which eliminate the need for installing plywood covers.

Yet another further object of the present invention is to provide an overlay protection plate apparatus and method which eliminate the need to remove the many smaller pieces of fragmented asphalt from the bore hole for loading onto trucks.

It is a still further object of the present invention to provide an overlay protection plate apparatus and method which eliminate all the problems associated with the bolts.

Also a further object of the present invention is to provide an overlay protection plate apparatus and method which eliminate the need to pry out the plates.

These and other objects of the present invention will become apparent to those skilled in the art from a careful review of the detailed description which follows.

SUMMARY OF THE INVENTION

The overlay protection plate apparatus and method of the present invention include means and method for providing a light fixture support for placement as a partially embedded support for a light fixture in an airport runway, taxiway, or other aircraft ground traffic area; an overlay protection plate for protecting against paving material entering the light fixture support during airport paving operations; plate locating means for locating the position of the overlay protection plate after the airport paving operations have covered over the overlay protection plate; and plate withdrawal means for removing the covered overlay protection plate, wherein the plate withdrawal means is capable of removing the pavement cover in substantially one piece over the overlay protection plate. In one aspect, the plate locating means and method include providing a ferrous center point rod connected to the overlay protection plate and a magnetic detecting device for locating the center point rod buried in pavement. The apparatus and method of the present invention provide for core-drilling the pavement cover over the overlay protection device and removing a drilled asphalt cover, in one piece, having a core diameter about one inch larger than the diameter of the light fixture support. The overlay protection plate is firmly held bolt-free on the light fixture support until the overlay protection plate, together with the pavement covering it in one piece, are to be lifted up and away from the light fixture support.

DETAILED DESCRIPTION OF THE PREFERRED EMBODIMENT

Referring now to FIGS. 1a–1e, plate 1 of the overlay protection plate of the present invention has a drilled center hole through its center point. Threaded nut 5 is aligned with the center hole. Nut 5 is welded at 20 to the bottom side of said plate 1.

Center point rod 2 has its bottom end 2a and its top end 2b threaded. The section of the center point rod 2 between the two threaded ends is not threaded.

Prior to threading in bottom end 2a of center point rod 2 through bottom side threaded nut 5, the bottom end 2a is threaded in throughout threaded nut 9. Then center point rod 2 is threaded, from the top side of plate 1, through bottom side threaded nut 5, so that threaded nut 9 remains threaded onto center point rod 2, on the top side of plate 1.

Center point rod 2 has its top end 2b threaded. When the threads on top end 2b are exposed, either a female threaded eye bolt 7 or a female threaded coupling 8 and a male threaded eye bolt 7a are threaded onto said threaded top end 2b.

Figures 1A, 1B, 1E:
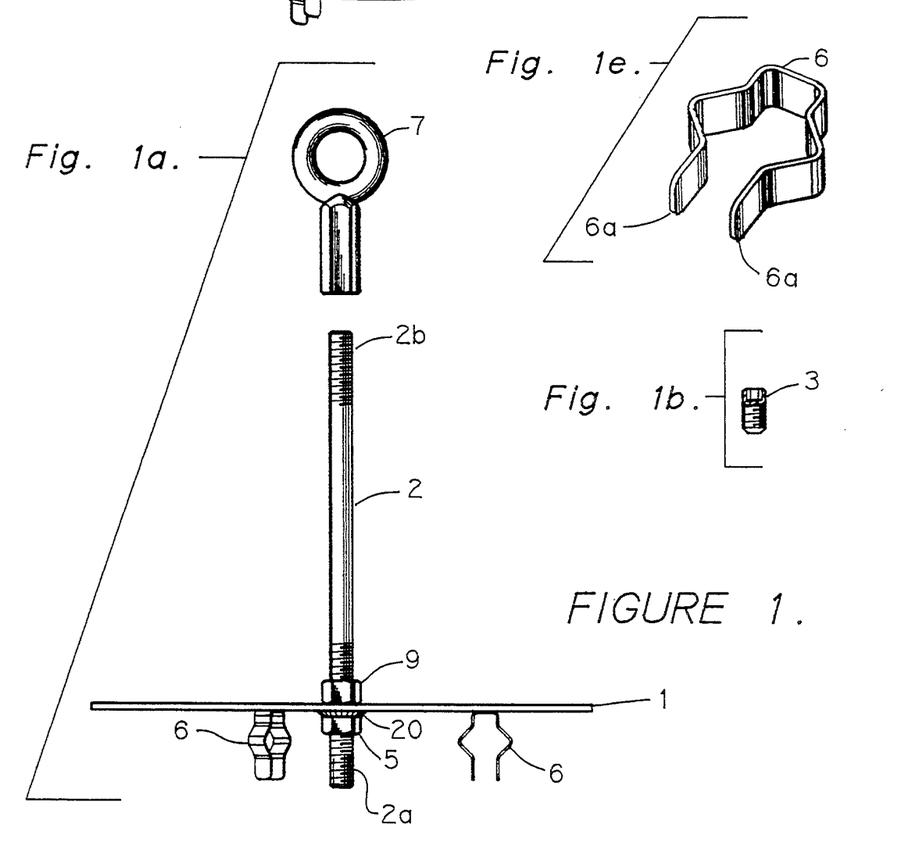
FIG. 1 shows FIG. 1a–1e provide elevation and perspective views of the overlay protection plate of the present invention, a view of one type fastener, and a view of the plug of the present invention.
Figures 1C, 1D:
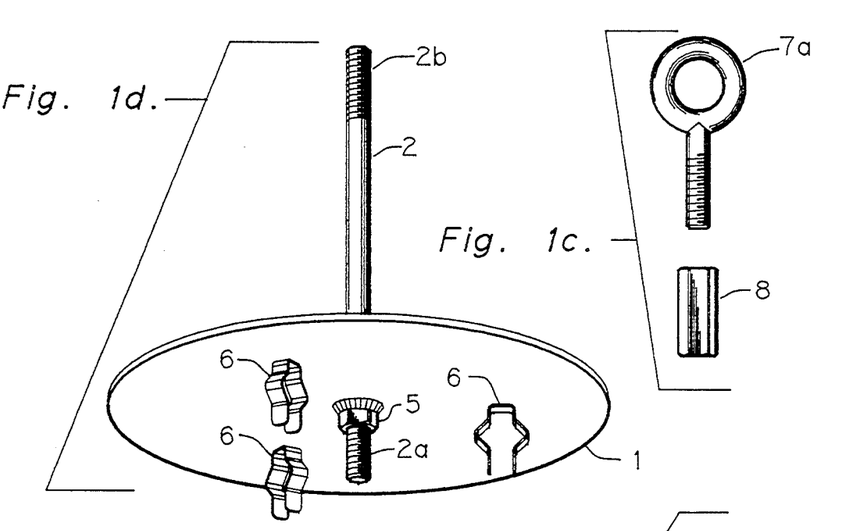

Prior to the roto-milling of existing runways, taxiways, and other aircraft ground traffic surfaces and prior to installing the overlay protection plate of the present invention, threaded plug 3 (FIG. 1b) is installed on plate 1, from its top side and through the drilled hole, through the center point of plate 1 and onto threaded nut 5. Spring extension fasteners 6 have setting points 6a for making a press-fit attachment to set-in-the-ground airport lighting fixture supports.

Figure 2:
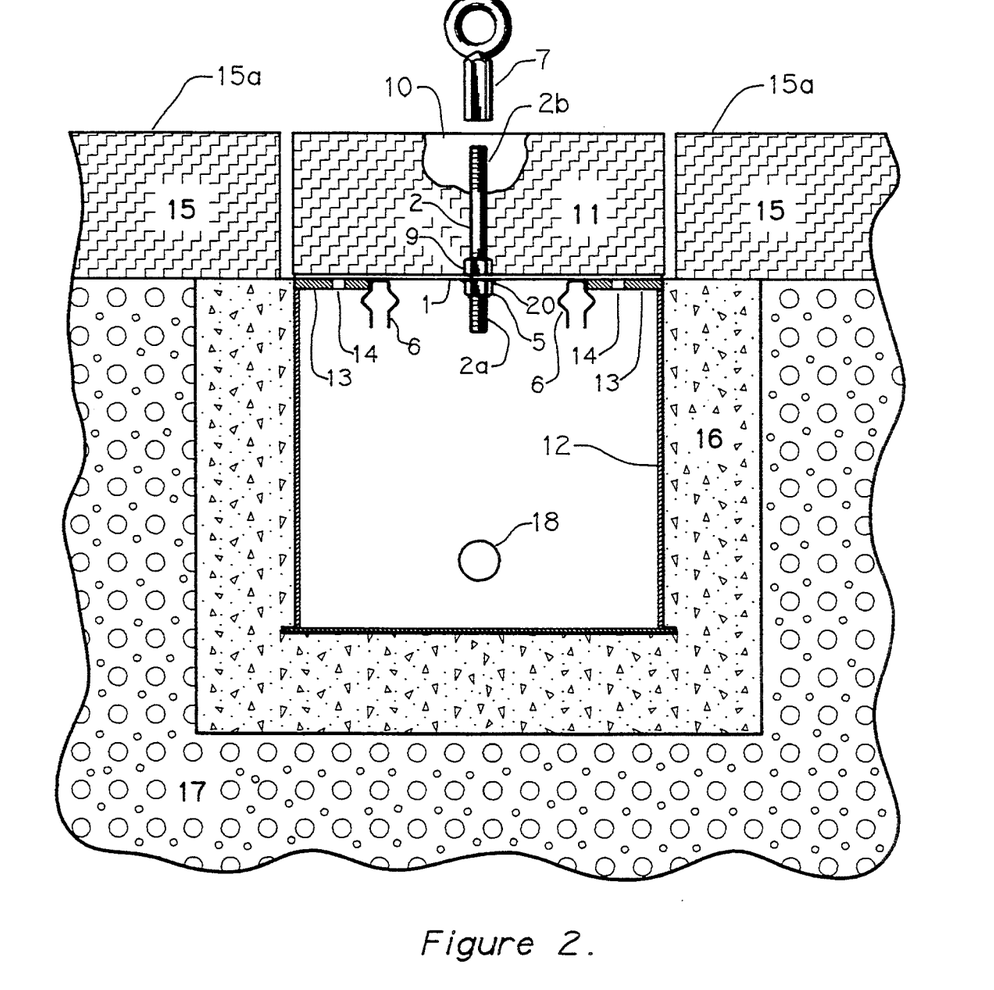
FIG. 2 shows an elevation view, partially in section, of the overlay protection plate of the present invention installed upon a bottom section container with a core-drilled cylinder of compacted asphalt pavement on the overlay protection plate.

Referring now to FIG. 2, the overlay protection plate of the present invention preferably requires round plate 1, made of steel or other similar material, to have a diameter approximately equal to the diameter of bottom section container 12. The round plate material is of a thickness capable of supporting the weight of core-drilled, compacted asphalt cylinder 11, which is lifted by the overlay protection plate of the present invention.

Bottom container 12 is generally set in concrete 16 in the granular sub-base fill 17 that generally constitutes the sub-base of the runways, taxiways, and other aircraft ground traffic surfaces and upon which sub-base are laid the various layers of asphalt (bituminous) pavement 15. Aperture 18 provides access for electrical conduit to container 12.

Figure 5:
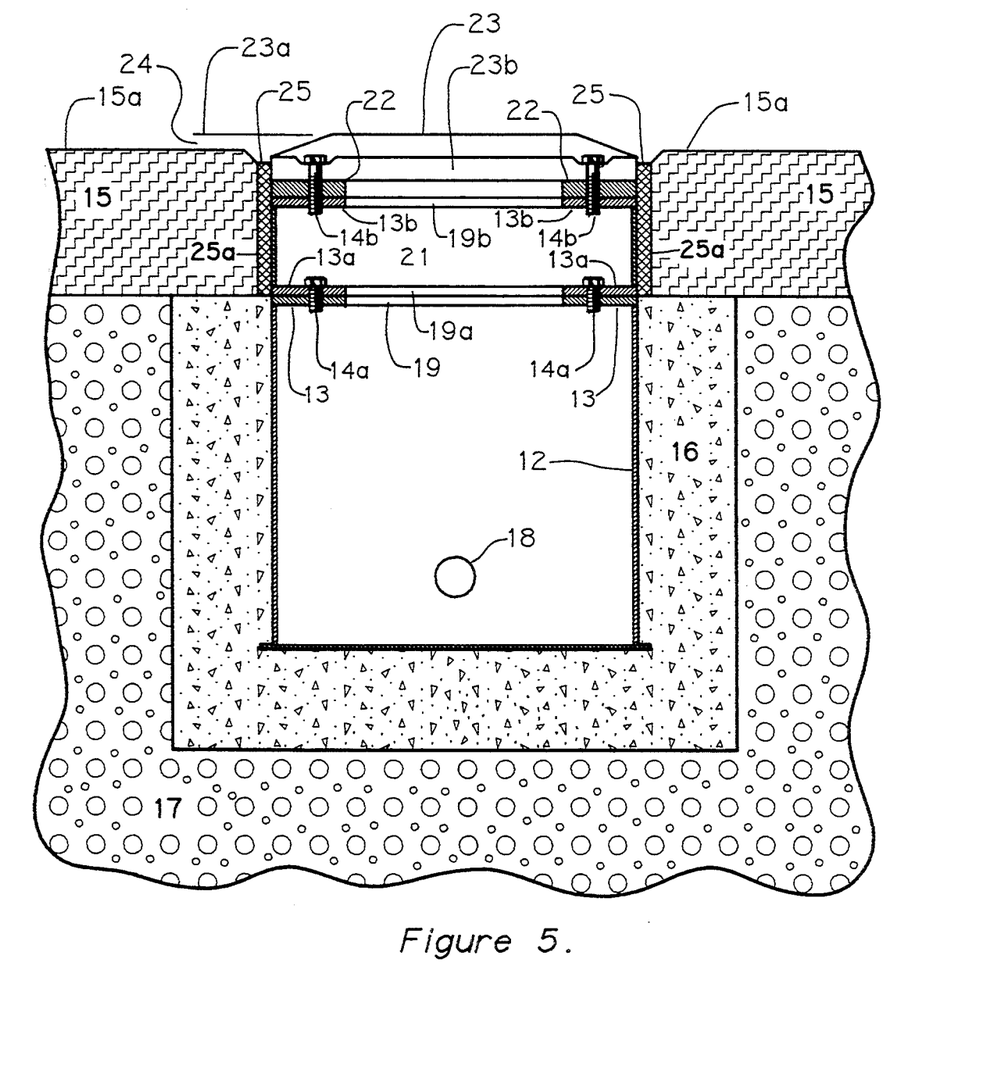
FIG. 5 shows an elevation view, partially in section, of a fixed-length extension with a spacer ring and a lighting fixture after final installation upon a bottom section container.

The overlay protection plate of the present invention provides method and means for its firm attachment to bottom section container 12 (FIG. 5).

Continuing now to refer to FIG. 2, the overlay protection plate of the present invention has several spring expansion fasteners 6, which are used to snap shut opening 19 on flange 13 of bottom section container 12 or of opening 19b on flange 13b of fixed-length extension 21 (FIG. 5), by pushing fasteners 6 down into openings 19 or 19b (FIG. 5). The firm closing of openings 19 or 19b is accomplished by simply setting the overlay protection plate of the present invention on top of flanges 13 or 13b (FIG. 5), with setting points 6a (FIG. 1e) of spring fasteners 6, into opening 19 or 19b, then pushing down on the top side of plate 1, forcing spring fasteners 6 down into openings 19 or 19b to firmly attach the overlay protection plate of the present invention to container 12 or to extension 21, by a strong spring action of spring expansion fasteners 6, pressing against flange 13 or 13b through opening 19 or 19b. The described method and means for attaching the overlay protection plate of the present invention to container 12 or to fixed-length extension 21 eliminates the need for bolts.

The closing of the opening on the top flange 13 of bottom container 12 and the opening on the top flange 13b of fixed-length extension 21 is required in order to prevent asphalt pavement materials or other debris from falling into the bottom container 12. Asphalt pavement materials or debris can fall into container 12 when the airport runways, taxiways, and other aircraft ground traffic surfaces are first built and also when these surfaces are milled down by roto-milling machines and again when a new layer 15 of asphalt pavement is laid down to bring the elevation of the pavement surface 15a to the level specified.

The overlay protection plate of the present invention is installed on bottom container 12 or on fixed-length extension 21 prior to laying down asphalt pavement 15. In cases of repavement of existing runways, taxiways, and other aircraft ground traffic surfaces, an existing layer of bituminous pavement is removed by high speed roto-milling machines, prior to laying down new bituminous pavement 15. When roto-milling is to take place, the overlay protection plate of the present invention is installed prior to said roto-milling.

Prior to the roto-milling of existing runways, taxiways, and other aircraft ground traffic surfaces and prior to installing the overlay protection plate of the present invention, threaded plug 3 (FIG. 1b) is installed on plate 1, from its top side and through the drilled hole, through the center point of plate 1 and onto threaded nut 5 in order to prevent debris from falling into the bottom section 12 through the drilled center hole. After the roto-milling process and after all roto-milling debris has been cleaned out by the roto-milling contractor, plug 3 is removed and center point rod 2 is installed, prior to laying down any new asphalt pavement 15.

Center point rod 2 is threaded into bottom nut 5 so as to position setting top end 2b of rod 2 up to a height about one-half inch below the surface 15a of the new layer of bituminous pavement 15 to be laid down. When center point rod 2 is set to height, top side threaded nut 9 is screwed down and tightened against the top side of plate 1, so as to lock center point rod 2 at the set height. Prior to laying down the new pavement 15, center point rod 2 and the top side of plate 1 are lightly wiped with rags soaked in vegetable oil, in order to prevent asphalt pavement from sticking to them.

In cases where there is no roto-milling of an existing asphalt pavement, there is no need then for installing plug 3 (FIG. 1b). Instead, center point rod 2 is installed directly to plate 1 and bottom nut 5.

Center point rod 2 is utilized for finding the center point of the overlay protection plate of the present invention which corresponds with the center point of opening 19 on bottom container 12. The center point also corresponds with the center point of opening 19b on fixed-length extension 21. The center points are on the same axis but at different elevations.

After new pavement 15 is laid down, the overlay protection plate of the present invention and its center point rod 2 are buried under new asphalt pavement 15. This creates the need for core-drilling the asphalt pavement 15 laid on top of the overlay protection plate of the present invention in order to be able to remove it and to proceed with the process of completing the installation of the runway, taxiway, and other aircraft ground traffic area lighting systems.

Figure 3:
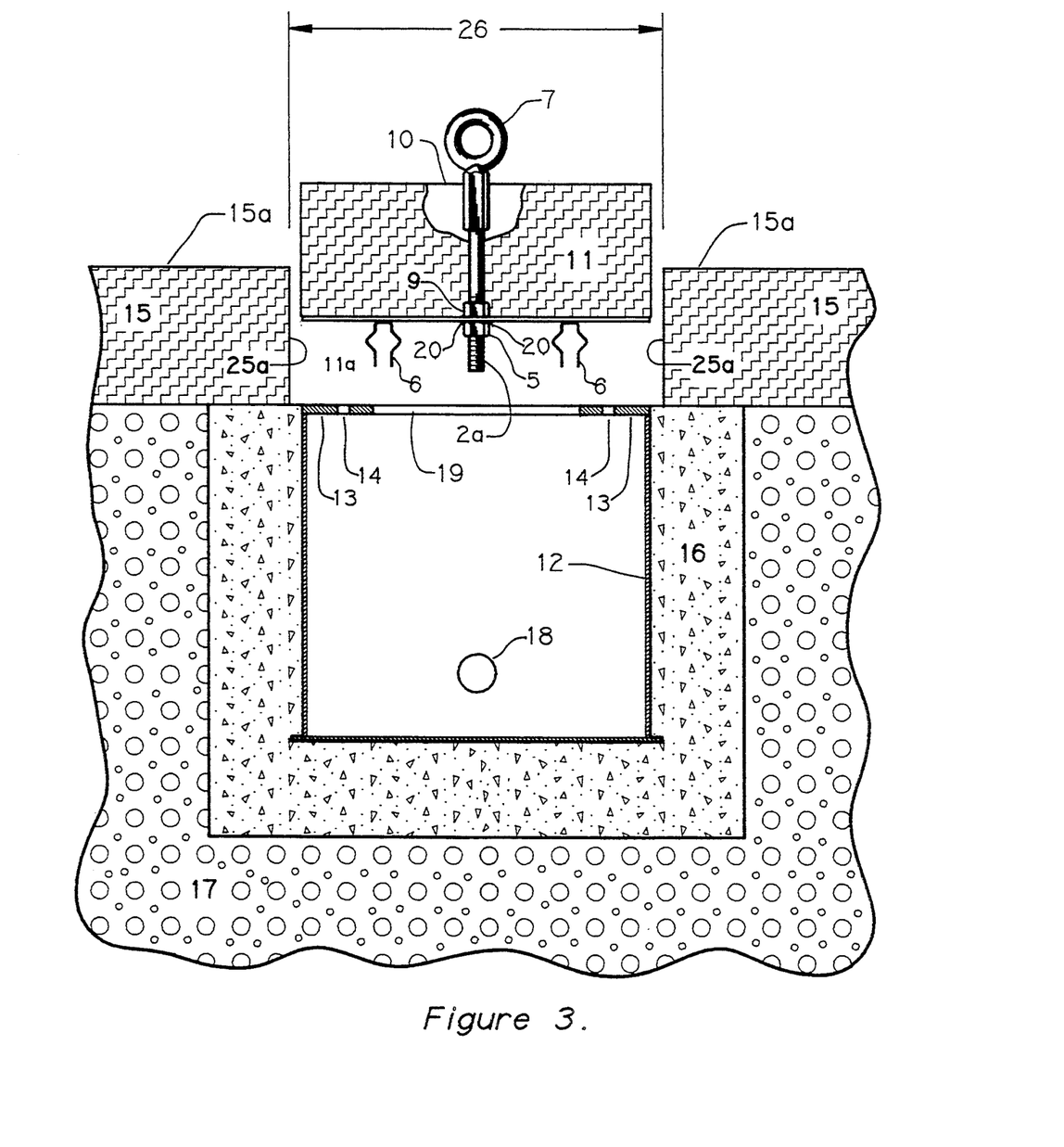
FIG. 3 shows an elevation view, partially in section, of the overlay protection plate of the present invention, which has been pulled and lifted up from the bottom section container to which it was attached, and a core-drilled cylinder of compacted asphalt pavement on it.
Figure 4:
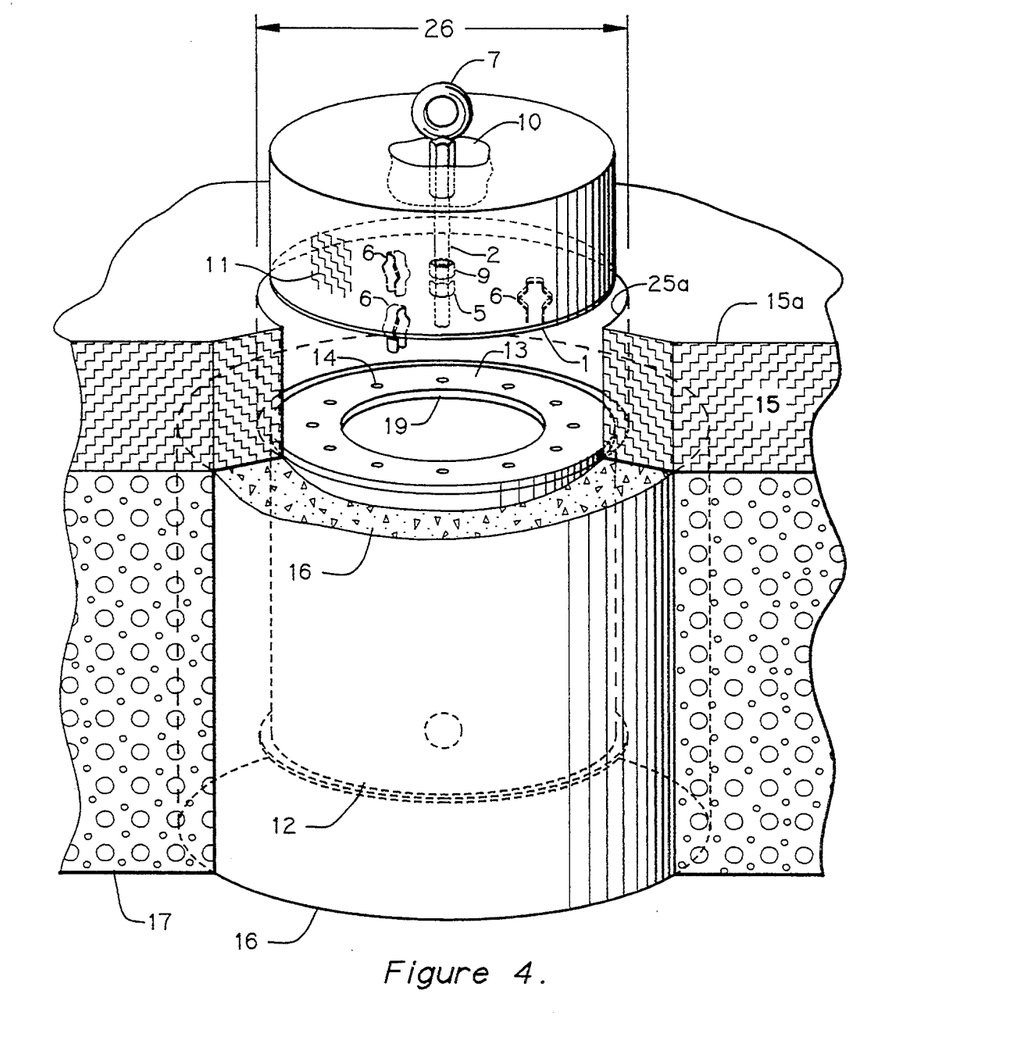
FIG. 4 shows a perspective view of the overlay protection plate of the present invention, which has been pulled and lifted up from the bottom section container to which it was attached, and a core-drilled cylinder of compacted asphalt pavement on it.

Referring now to FIG. 3 and FIG. 4, the core-drilling diameter 16 is approximately one inch larger than the diameter of the bottom container 12 in order to prevent container 12 from being damaged by a core-drilling bit, hence the requirement for establishing with precision the location of the center point to correctly position the core-drilling bit.

The top end 2b (FIG. 2) of center point rod 2, prior to laying the new pavement 15, is set in height at about one-half inch below the final pavement surface 15a. Rod 2 is locked into that position at the center point of the overlay protection plate of the present invention, which is on the same axis as the center point of container 12 or extension 21, whichever the case might be.

The top end 2b of center point rod 2 is positioned close to surface 15a of the new pavement 15 and is then found by any magnetic detecting device, eliminating the requirement to utilize surveyors with transits and drilling of two-inch pilot holes, for the finding of the center points. When the top end 2b of center point rod 2 is found, a small hole 10 is chipped away on surface 15a to provide access to top end 2b of center point rod 2.

When center point rod 2 is found, a precise centering reference point has been established for positioning the core-drilling bit.

After either eye bolt 7 or 7a is installed, the overlay protection plate of the present invention is readily detached from container 12 or fixed-length extension 21, carrying on the top side of plate 1 the core-drilled, compacted asphalt cylinder 11, in one piece. This is accomplished by hooking any available lifting device (not shown) onto eyebolt 7 or 7a and lifting up and away the overlay protection plate of the present invention, carrying on it the core-drilled, compacted asphalt cylinder 11 from bore hole 11a. The spring expansion fasteners 6 allow the overlay protection plate of the present invention to be detached from container 12 or fixed-length extension 21 when pulled up.

Among the many lifting devices which can be used are backhoes, truck-mounted winches, truck-mounted hydraulic arms, and other devices generally found at similar construction projects. The entire core-drilled asphalt cylinder 11 can be deposited, in one piece, by the lifting device, directly onto trucks.

The overlay protection plate of the present invention is then removed by tapping with a block of wood on the top end 2b of center point rod 2.

Because the overlay protection plate of the present invention is lifted right out of bore hole 11a carrying on it the core-drilled, compacted asphalt cylinder 11, there is no need to pry out overlay protection plate of the present invention. The need to breakup the cylinder by jack hammering is eliminated and, because there is no jack hammering, there is no need to install plywood covers.

Referring now to FIG. 5, completion requires the installation of fixed-length extension 21, the installation of one or more spacer rings 22 for height adjustment, and finally the installation of the light fixture 23. The top 23a of light fixture 23 is slightly above surface 15a of new pavement 15.

The removal of core-drilled, compacted asphalt cylinder 11 from the core-drilled hole 11a allows the contractor to proceed with the installation of fixed-length extension 21, by bolting its bottom flange 13a to the top flange 13 of bottom container 12 by means of six bolts 14a and by then bolting any additional height adjustment spacer rings 22 together with lighting fixture 23, by means of six bolts 14b to the top flange 13b of fixed-length extension 21.

The top portion 23a of lighting fixture 23 is set slightly above the surface 15a of the newly installed pavement 15 as indicated on the drawing by numeral 24.

The space 25a between the wall of the bore hole 11a and the fixed-length extension 21, spacer ring 22, and the bottom flange 23b of lighting fixture 23 then is sealed off with a special sealant 25.

Thus, it can be seen that a novel method and means have been provided for the protection of containers used in runways, taxiways, and other aircraft ground traffic areas as light bases, transformer housings, junction boxes, and accessories, in a manner that assures quick installation and removal, expeditious location when buried, the quick establishing of its precise center point, the capacity of lifting with it, in one piece, a heavy, core-drilled asphalt cylinder, and serving as the means for supporting the weight of a heavy, core-drilled asphalt cylinder when being lifted onto a disposal vehicle.

Thus it can be seen that the invention accomplishes all of its objectives.

The apparatus and process of the present invention are not limited to the descriptions of specific embodiments presented hereinabove, but rather the apparatus and process of the present invention should be viewed in terms of the claims that follow and equivalents thereof. Further, while the invention has been described in conjunction with several such specific embodiments, it is to be understood that many alternatives, modifications, and variations will be apparent to those skilled in the art in light of the foregoing detailed descriptions. Accordingly, this invention is intended to embrace all such alternatives, modifications, and variations which fall within the spirit and scope of the appended claims.

What is claimed is:

1. An overlay lifting and protection plate apparatus, comprising:
   (a) a light fixture support for placement as a partially embedded support for a light fixture in an airport runway, taxiway, or other aircraft ground traffic area;
   (b) an overlay lifting and protection plate for protecting against paving material entering said light fixture support during airport paving operations;
   (c) plate locating means for locating the position of said overlay lifting and protection plate after said airport paving operations have covered over said overlay lifting and protection plate; and
   (d) plate withdrawal means for removing said covered overlay lifting and protection plate, wherein said plate withdrawal means is capable of lifting the pavement cover in substantially one piece over said overlay lifting and protection plate.

2. An overlay lifting and protection plate apparatus as set forth in claim 1, wherein said plate withdrawal means is capable of forming an opening in said airport pavement for providing light fixture installing access to said light fixture support.

3. An overlay lifting and protection plate apparatus as set forth in claim 2, wherein said plate locating means comprises:
   (i) a ferrous center point rod connected to said overlay lifting and protection plate; and
   (ii) a magnetic detecting device for locating said center point rod buried in pavement.

4. An overlay lifting and protection plate apparatus as set forth in claim 3, wherein said ferrous center point rod is positioned on said overlay lifting and protection plate to set a rod height of about one-half inch below the final pavement surface.

5. An overlay lifting and protection plate apparatus as set forth in claim 4, wherein said ferrous center point rod is connected to said overlay lifting and protection plate at about the plate center point.

6. An overlay lifting and protection plate apparatus as set forth in claim 5, wherein said ferrous center point rod comprises a threaded bottom end connected to said overlay lifting and protection plate through a threaded center hole.

7. An overlay lifting and protection plate apparatus as set forth in claim 6, wherein said overlay lifting and protection plate for protecting against paving material entering said light fixture support during airport paving operations further comprises a threaded plug for said center hole.

8. An overlay lifting and protection plate apparatus as set forth in claim 7, wherein said plate withdrawal means for removing said covered overlay lifting and protection plate comprises means for core-drilling said pavement cover over said overlay lifting and protection device.

9. An overlay lifting and protection plate apparatus as set forth in claim 8, wherein said means for core-drilling said pavement cover over said overlay protection device is capable of producing a drilled asphalt cover core diameter about one inch larger than the diameter of said light fixture support.

10. An overlay lifting and protection plate apparatus as set forth in claim 9, wherein said plate withdrawal means for removing said covered overlay lifting and protection plate comprises press-fit attachment means for holding said overlay lifting and protection plate on said light fixture support.

11. An overlay lifting and protection plate apparatus as set forth in claim 10, wherein said press-fit attachment means for holding said overlay lifting and protection plate on said light fixture support comprises at least two spring extension fasteners fixed to the bottom of said overlay lifting and protection plate.

12. An overlay lifting and protection plate apparatus as set forth in claim 11, wherein said plate withdrawal means for removing said covered overlay lifting and protection plate comprises a threaded top end on said center point rod and a threaded eyebolt or coupling for attachment to said threaded top end.

13. A method of protecting an airport inset light support, comprising:
(a) providing a light fixture support for partially embedded placement in an airport runway, taxiway, or other aircraft ground traffic area and having means for holding an airport inset light;
(b) providing an overlay lifting and protection plate for protecting against paving material entering said light fixture support during airport paving operations;
(c) locating the position of said overlay lifting and protection plate after said airport paving operations have covered over said overlay lifting and protection plate; and
(d) lifting said covered overlay lifting and protection plate together with the pavement cover in substantially one piece over said overlay lifting and protection plate.

14. A method of protecting an airport inset light support as set forth in claim 13, further comprising forming an opening in said airport pavement for providing light fixture installing access to said light fixture support.

15. A method of protecting an airport inset light support as set forth in claim 14, wherein said locating step comprises connecting a ferrous center point rod to said overlay lifting and protection plate at about the plate center point and magnetically detecting said center point rod buried in pavement.

16. A method of protecting an airport inset light support as set forth in claim 15, comprising positioning said ferrous center point rod on said overlay lifting and protection plate to set a rod height of about one-half inch below the final pavement surface.

17. A method of protecting an airport inset light support as set forth in claim 16, further comprising core-drilling said pavement cover over said overlay lifting and protection device and producing a drilled asphalt cover core diameter about one inch larger than the diameter of said light fixture support.

18. A method of protecting an airport inset light support as set forth in claim 17, comprising holding said overlay lifting and protection plate on said light fixture support bolt-free by press-fit attachment.

19. A method of protecting an airport inset light support as set forth in claim 18, wherein said removing step comprises lifting said overlay lifting and protection plate together with said pavement cover by lifting an eyebolt or coupling threadably attached to the top end of said center point rod.

20. An airport inset light overlay lifting and protection plate apparatus, comprising:
(a) a light fixture support for placement as a partially embedded support for a light fixture in an airport runway, taxiway, or other aircraft ground traffic area;
(b) an overlay lifting and protection plate for protecting against paving material entering said light fixture support during airport paving operations;
(c) plate locating means for locating the position of said overlay lifting and protection plate after said airport paving operations have covered over said overlay lifting and protection plate, said plate locating means comprising:
(i) a ferrous center point rod having a threaded bottom end connected to said overlay lifting and protection plate through a threaded center hole at about the plate center point and a threaded top end capable of being positioned to set a rod height of about one-half inch below the final pavement surface; and
(ii) a magnetic detecting device for locating said center point rod when buried in pavement;
(d) a threaded plug for said center hole;
(e) means for core-drilling said pavement cover over said overlay protection device for producing a drilled asphalt cover core diameter about one inch larger than the diameter of said light fixture support;
(f) plate withdrawal means for removing said covered overlay lifting and protection plate, wherein said plate withdrawal means is capable of lifting and removing the pavement cover in substantially one piece over said overlay lifting and protection plate and further is capable of forming an opening in said airport pavement for providing light fixture installing access to said light fixture support, said plate withdrawal means comprising:
(i) a threaded top end on said center point rod; and
(ii) a threaded eyebolt or coupling for attachment to said threaded top end; and
(g) at least two spring extension fasteners fixed to the bottom of said overlay lifting and protection plate, for holding said overlay lifting and protection plate bolt-free on said light fixture support.

* * * * *